United States Patent [19]

Hulbert et al.

[11] Patent Number: 5,764,688
[45] Date of Patent: Jun. 9, 1998

[54] APPARATUS FOR USE IN EQUIPMENT PROVIDING A DIGITAL RADIO LINK BETWEEN A FIXED AND A MOBILE RADIO UNIT

[75] Inventors: Anthony Peter Hulbert, Shirley; Robert Julian Stedman, Hedge End, both of England

[73] Assignee: Roke Manor Research Limited, Hampshire, England

[21] Appl. No.: 497,544

[22] Filed: Jun. 30, 1995

[51] Int. Cl.[6] .................................................. H04B 1/707
[52] U.S. Cl. .......................... 375/206; 375/347; 375/367
[58] Field of Search ..................................... 375/200, 208, 375/330, 367, 206, 347; 370/320, 335, 342, 441

[56] References Cited

U.S. PATENT DOCUMENTS

| | | |
|---|---|---|
| 5,237,586 | 8/1993 | Bottomley. |
| 5,305,349 | 4/1994 | Dent. |
| 5,414,728 | 5/1995 | Zehavi ................................. 370/342 |
| 5,442,625 | 8/1995 | Gitlin et al. ........................ 370/342 |
| 5,471,497 | 11/1995 | Zehavi ................................. 375/200 |
| 5,594,755 | 1/1997 | Hulbert ................................ 375/208 |
| 5,621,752 | 4/1997 | Antonio et al. ..................... 375/208 |

Primary Examiner—Stephen Chin
Assistant Examiner—Don N. Vo
Attorney, Agent, or Firm—Hill & Simpson

[57] ABSTRACT

The present invention relates to an apparatus for providing a digital radio link between at least one fixed unit and at least one mobile unit wherein the apparatus comprises a small number of Rake fingers, one or more of which is assigned at any given to perform a searching operation. Whenever a searching Rake finger or fingers finds a path with higher energy than the current lowest Rake finger, the roles of the Rake finger are exchanged.

8 Claims, 4 Drawing Sheets

5,764,688

1
APPARATUS FOR USE IN EQUIPMENT PROVIDING A DIGITAL RADIO LINK BETWEEN A FIXED AND A MOBILE RADIO UNIT

BACKGROUND OF THE INVENTION

1. Field of the Invention

The present invention relates generally to the field of telecommunications equipment and, more particularly, the present invention relates to an apparatus for use in telecommunications equipment which provides a digital radio link using direct sequence spread spectrum between fixed and mobile radio units.

2. Description of the Related Art

Co-pending Great Britain Patent Application No. 9316489.5, which is incorporated herein by reference, describes a Rake receiver in which the sampling of the signal is applied at only one sample per chip. Rake fingers are designed to cover the whole delay spread of the signal in one chip intervals, and because together, the Rake fingers examined the entire delay spread, this eliminated the need for a searcher function to allow the receiver to operate with the best possible responsiveness to changing channel conditions.

SUMMARY OF THE INVENTION

The present invention relates to a different requirement for a Rake receiver in which the channel is changing very slowly and the equipment is extremely cost sensitive. In this situation, there is no need to have a receiver which can respond rapidly to changing channel conditions. For this reason it is desirable to have only a few Rake fingers that are likely to be active at any given time. It may not be immediately apparent that sampling at only one sample per chip is advantageous. In fact, the use of single sample per chip operation, coupled with an appropriate Rake assignment algorithm leads to unique advantages, as set forth below.

With Nyquist filtering, degradation due to correlation of noise across the Rake fingers is avoided because the gaps between fingers are always timed to coincide with the zeros of the auto-correlation function of the filtered receiver input noise.

The course alignment of Rake fingers means that there is no need to run tracking loops. In the same way as for the comprehensive Rake receiver as described in the above mentioned patent application, the result is a significant saving in complexity. In essence, the slowly changing characteristics of the channel are tracked by occasionally re-assigning the timing of a Rake finger.

An object of the present invention is to provide apparatus for use in telecommunications equipment which provides a digital radio link between fixed and mobile radio units in which the apparatus has n Rake fingers out of which n-1 can be active at any given time. According to the present invention an apparatus is provided for use in equipment providing a digital radio link between fixed and mobile radio units. The apparatus is comprised of a plurality of Rake fingers and a means for controlling the operation of each Rake finger so that at any given time one Rake finger is arranged to search the delay spread. The system also includes a means for examining the energy of each Rake finger so that whenever a Rake finger is found to have an energy lower than that found by the Rake finger currently searching, the Rake finger with the lower energy takes over the searching function while the previous Rake finger that was searching becomes an active Rake finger.

BRIEF DESCRIPTION OF THE DRAWINGS

An embodiment of the present invention will now be described with reference to the accompanying drawings wherein.

DETAILED DESCRIPTION OF THE PREFERRED EMBODIMENTS

Figure 1:
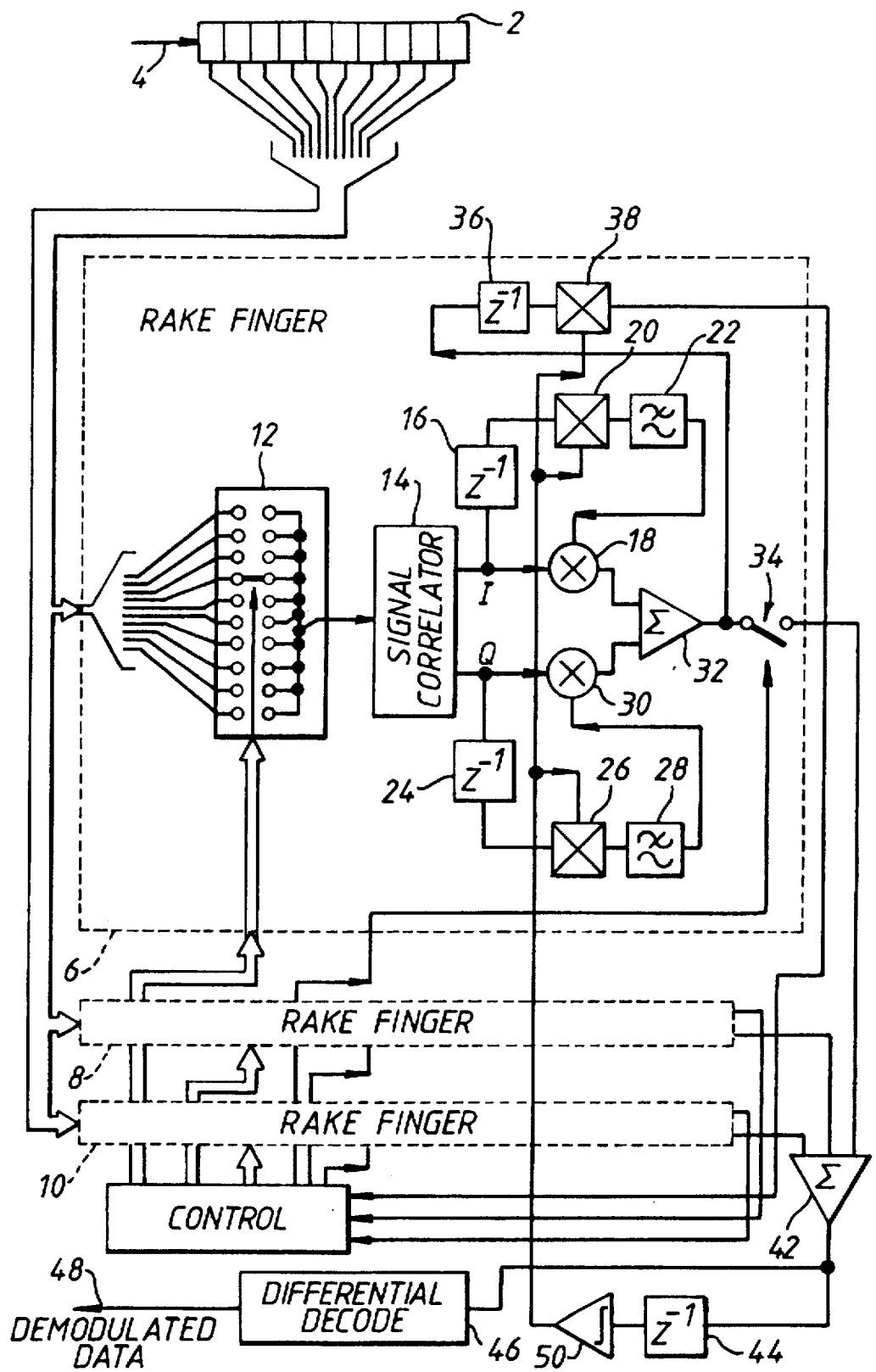
FIG. 1 is a block diagram illustration of a basic Differential Phase Shift Keying (DPSK) receiver.

Referring to FIG. 1, a basic DPSK receiver is shown. The receiver comprises a complex shift register 2 which receives a digital complex baseband signal at an input 4. The receiver is shown having three Rake fingers 6, 8, 10. Each Rake finger comprises a switch 12 having a number of first contacts, each of which is connected to a respective stage of the complex shift register 2. Each of the input contacts has a respective output contact which is connected to a signal correlator 14 so that each of the individual outputs from the complex shift register 2 can be applied to the input of the signal correlator 14. The output of the correlator 14 comprises two output lines, an In-phase line and a Quadrature phase line. The In-phase line is connected to an input of a 1-bit delay circuit 16 and to the input of a multiplying circuit 18. The output of the delay circuit 16 is connected to the input of a multiplying circuit 20, the output of which is connected to a filter 22. The output of the filter 22 is connected to a further input of the multiplying circuit 18. Similar circuitry is provided for the quadrature output of the correlator 14 and comprises a 1-bit delay circuit 24, a multiplying circuit 26, a filter 28 and a further multiplying circuit 30.

The outputs from the multiplying circuits 18, 30 are connected to a respective input of a summer 32, the output of which is connected to an input of a switch 34 and to an input of a further 1-bit delay circuit 36. The delay circuit output is connected to an input of a multiplying circuit 38. The output of the multiplying circuit 38 is applied to a first input of a controller 40. The output of the switch 34 is connected to the input of a summer 42. The summer 42 also receives two further inputs from the switches 34 in the other Rake fingers 8, 10. The output of the summer 42 is connected to the input of a 1-bit delay circuit 44 and to the input of a differential decode circuit 46, the output of which generates the demodulated data on line 48. The output of the 1-bit delay circuit 44 is connected to an input of a hard-limiting device 50, the output of which is connected to a second input of the multiplying circuit 20, 26, 38. An output from the multiplying circuit in each of the other Rake fingers 8, 10 corresponding to the output of the multiplying circuit 38 is connected to an input of the controller 40 respectively. The controller generates an output signal for each of the Rake fingers for controlling operation of the switch 12 and also provides a control signal for controlling operation of the switch 34 in each of the Rake fingers.

FIG. 1 illustrates a parallel architecture for a spread spectrum DPSK receiver using decision direction for channel estimation. As described above, it shows three Rake fingers, (i.e. n=3 and a maximum of two Rake fingers are active at any given time) a receiver which covers a delay spread of ten chips. The complex shift register 2, covers the ten chips of delay spread and any of the Rake fingers 6, 8, 10 may select any of these ten delays.

Considering the operation of the first Rake finger 6, the first operation is to connect the selected delay position to the input of the correlator circuit 14 by means of the switch 12. The use of a single shift register with a switch having a plurality of selectable outputs for each of the Rake fingers is merely for purposes of illustration only. For example, a much more efficient means for performing this function could be accomplished by using pointers into a memory. The choice of switch connections for each Rake finger is performed under control of the controller 40, which will be described in detail below.

The operation of FIG. 1 following the signal correlator 14 is basically as described in the above mentioned patent application. The outputs, I and Q of the correlator circuit 14 pass through the one bit delay circuits 16, 24 respectively into the multiplying circuits 20, 26 which remove the modulation detected on the previous symbol. Having removed the modulation, the signals are passed to estimating filters 22, 28 to provide an overall estimate of the complex path amplitude for the delay selected by the switch 12. This estimate is fed to the multiplying circuits 18, 30 to phase align and amplitude weight the signal in conjunction with the summer 32. At this point, a signal component suitable for combining is available. However, the component will only be combined if the signal is not the weakest (i.e. if the Rake finger is not currently searching). This decision is made by the controller 40 acting upon information obtained from the 1-bit delay circuit 36 and the multiplying circuit 38 in each Rake finger. The delay circuit 36 inserts a 1-bit delay allowing the overall modulation, again to be removed from the signal on the selected path (this time after phase alignment and amplitude weighting) by the multiplying circuit 38. Comparison of the levels at the output of the multiplying circuit 38 (after averaging in the controller) for each of the Rake fingers, allows it to assign the Rake fingers which contribute signal to the output and the Rake finger which is currently serving only to search for the stronger paths.

Figure 2:
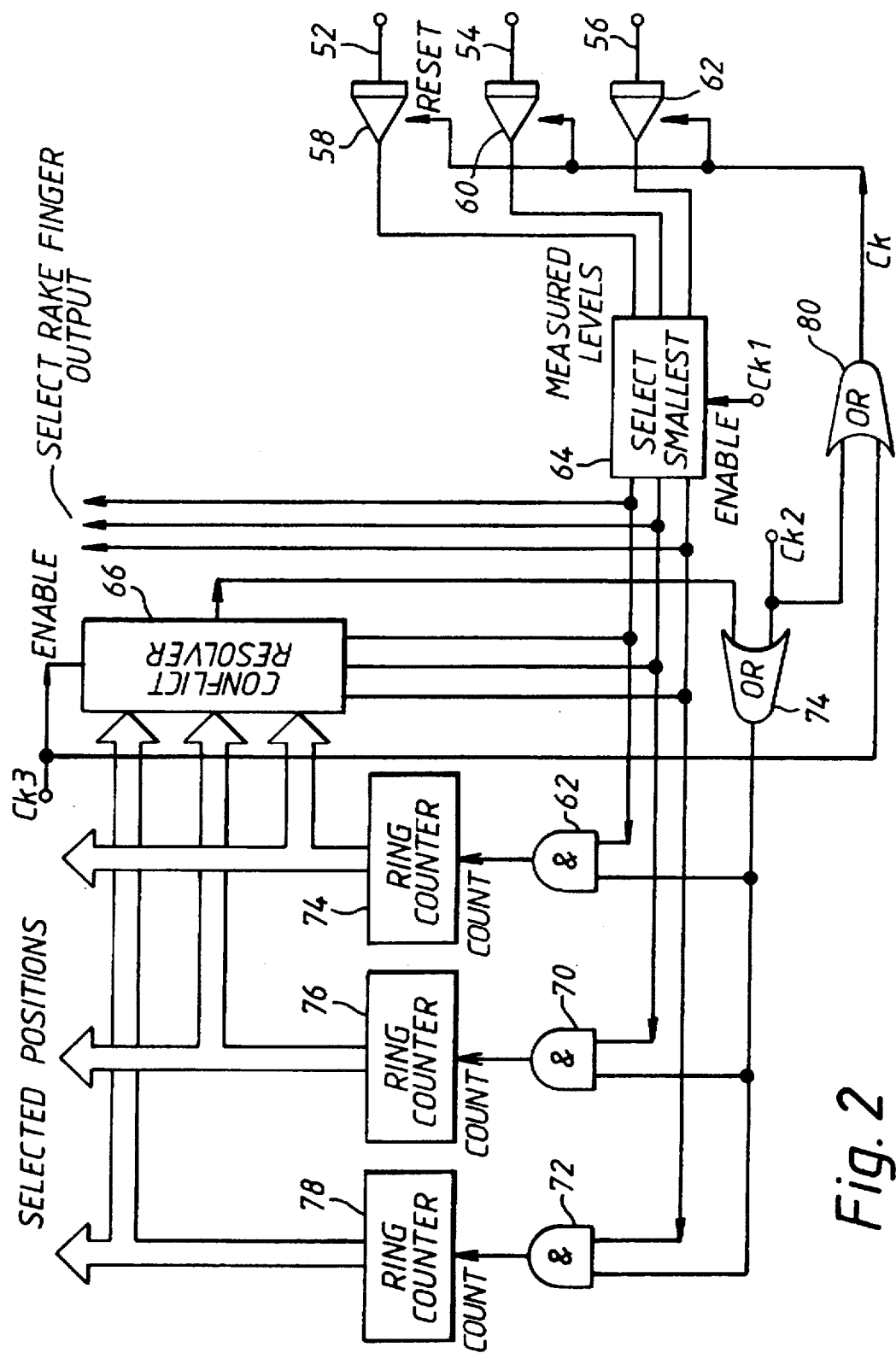
FIG. 2 is a block diagram illustration of the controller shown in FIG. 1.
Figure 3:
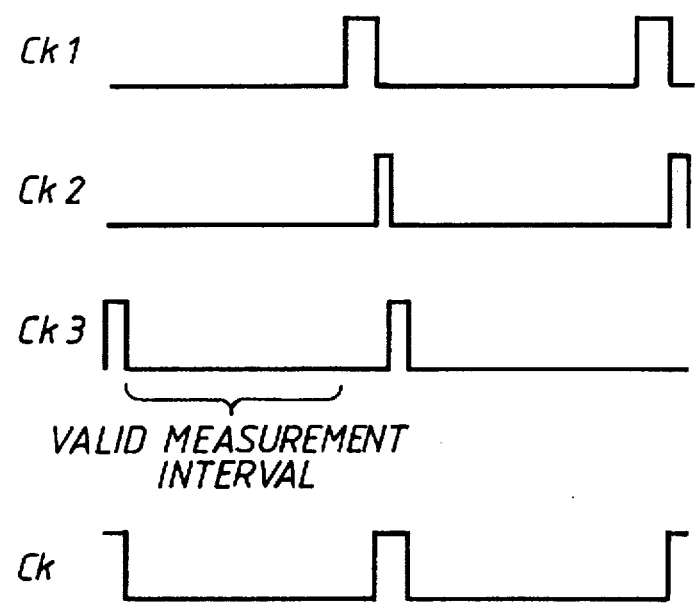
FIG. 3 illustrates the timing diagrams for clock signals for the system illustrated in FIG. 2.

Referring to FIGS. 2 and 3, the controller will now be described. The controller comprises three input lines 52, 54, 56 which receive the respective outputs from the multiplying circuit 38 in each Rake finger of FIG. 1. The signals are applied via integrators 58, 60, 62 to an input of a selection circuit 64, respectively. The outputs from the selection circuit 64 are applied directly to the Rake fingers to control the switch 34 in each Rake finger. The outputs are also applied to an input of a conflict resolver 66 and to an input of AND gates 68, 70, 72 respectively. The conflict resolver 66 generates an output signal which is applied to an input of an OR gate 74, the output of which is applied to a further input of AND gates 68, 70 and 72 respectively. The outputs from the AND gates 68, 70 and 72 are connected to the input of a ring counter 74, 76, 78 respectively, the outputs of which are used by the respective Rake fingers of FIG. 1 to select the position of the switch 12 for that particular Rake finger. The output of the ring counters are also applied to further inputs of the conflict resolver 66. The conflict resolver 66 receives a clock enable signal Ck3, and the same signal is also applied to the input of an OR-gate 80. The OR-gate 80 and the OR-gate 74 receive a clock signal Ck2, and the output of the OR-gate 80 provides a clock signal in order to reset the integrators 58, 60, 62. The operation of the controller will now be described with reference to FIG. 3.

While the clock signal CK1 is high, the selection circuit 64 is enabled. This compares the measured levels at its inputs after averaging by the integrators 58, 60 and 62 and produces a high level on the output which corresponds to the lowest measured level. All other outputs are low. These output changes are latched so that they occur essentially instantaneously (well within a bit period). The outputs directly control the switches 34 in each of the Rake fingers (a low level on a line results in a switch connection which is closed). Thus, all the Rake finger outputs except the weakest are combined.

Next, the clock signal Ck2 goes high, producing a pulse on the input of the ring counter corresponding to the path selected for the relevant Rake finger. This moves the path delay by one chip. If the end of the search delay spread is reached, the path will be switched back to the beginning because ring counters are used. This operation will be correct provided the increment does not place the Rake finger path onto the same delay as an existing Rake finger's path. The conflict resolver 66 serves to avoid this. When the clock signal Ck3 goes high, the conflict resolver 66 compares the counts on each of the Rake fingers other than the selected (weakest) one, against the selected one. Every time a match is found, the conflict resolver 66 produces a pulse which increments the ring counter for the selected path until all comparisons have been tried.

The Rake finger which has been assigned the searching function is now examining a new position. During the period labelled "valid measurement interval", a new measurement is performed for the new position (and the measurements are updated for the existing Rake fingers), making the measured levels valid for a new update. The measurements are completely new because the clock signal Ck has reset the integrators 52, 54, 56 which now accumulate the new value.

The process will be repeated with the same Rake finger searching in one shift steps across the delay spread, missing out the currently raked paths, until it measures a path to have a higher power than measured on the existing Rake finger positions. When this happens, the existing Rake finger will begin to search and the previously raking finger will feed into the summer 42 of FIG. 1.

More efficient searching could be achieved, if the newly searching Rake finger were to carry on searching from where the previously searching Rake finger finished. This could be achieved by loading the ring counter corresponding to the new searcher with the contents of the ring counter corresponding to the old searcher, prior to incrementing. Additional circuitry to achieve this may be implemented in a manner known to those of ordinary skill in the art.

It is also possible to have more than one searcher operational simultaneously. For example, with p searches, at the end of each measurement interval, the searches become re-assigned as the p Rake fingers holding the p lowest measured energies. The search is then progressed with paths in mutually exclusive search patterns. This can be achieved in one of many ways, e.g. constrain the ring counters to counting steps of p from different modulo p start positions, or constrain the ring counters to counting single steps but over different ranges.

The ability to provide for different numbers of searching Rake fingers affords a possibility of a new level of adaptability in which the number of Rake fingers given over to searching and the remainder for raking energy is varied in accordance with the variability of the channel. Thus, for a rapidly changing channel, more Rake fingers would be needed for searching than on a slowly changing channel. Moreover, for a rapidly changing channel, the estimating filter length must be shorter, resulting in poorer channel estimates, leading to increased combiner loss. Thus, for the rapidly changing channel, fewer Rake finger outputs can usefully be combined, therefore some of these can be relinquished and given over for searching.

Figure 4:
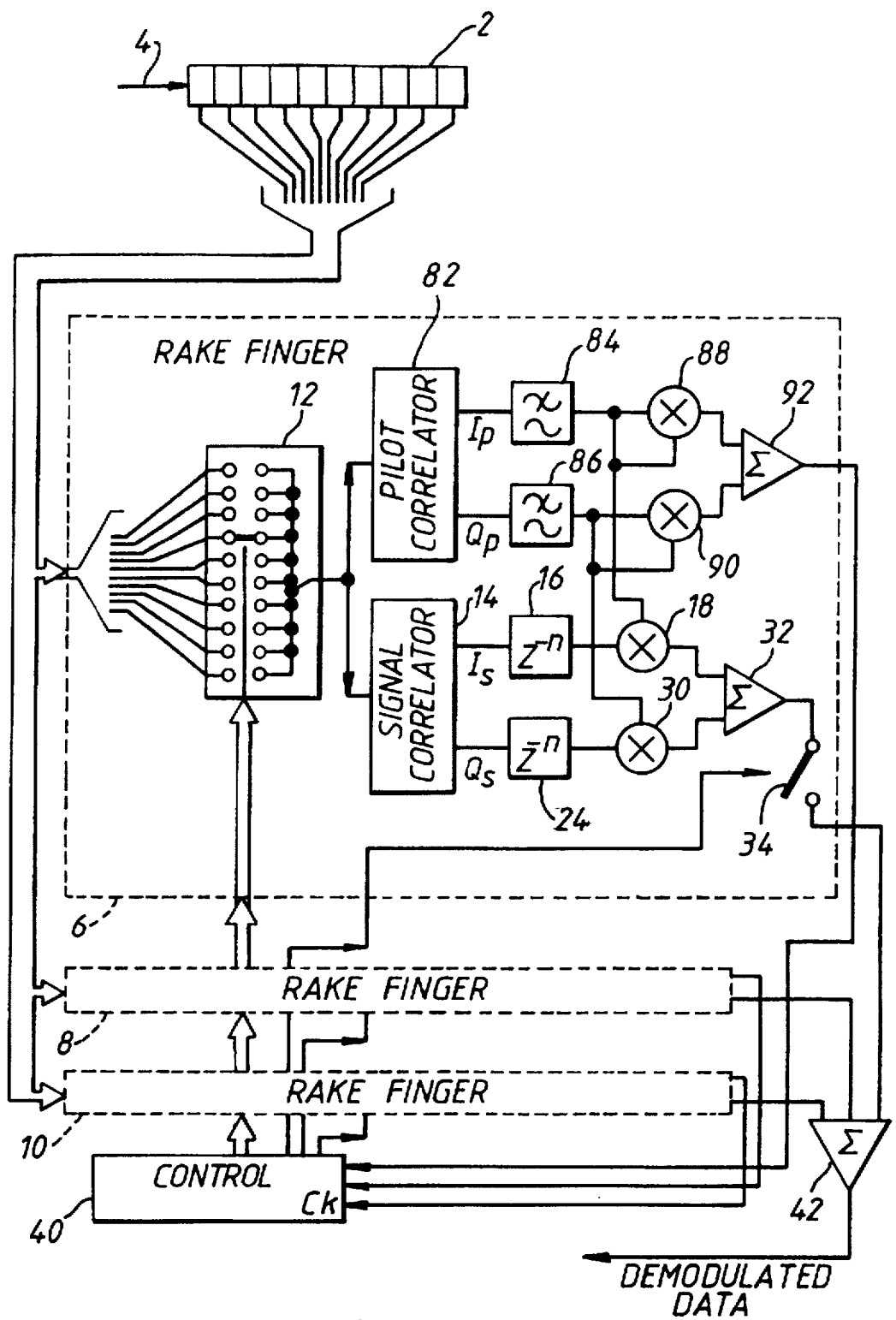
FIG. 4 is a block diagram illustration of a basic Binary Phase Shift Keying (BPSK) receiver.

With reference to FIG. 4, the architecture of a binary phase shift keying receiver is shown where a pilot signal is transmitted. The circuit is very similar to FIG. 1 and like elements have been given like reference numerals. The only important difference between FIG. 4 and FIG. 1 is the absence of the decision direction circuitry and the inclusion of the pilot correlator 82. The pilot correlator 82 generates two output signals, an in-phase and a quadrature phase signal Ip, and Qp respectively. Each of these signals are passed through a filter circuit 84, 86 and then to a multiplying circuit 88, 90 which effectively squares the output of the respective filter circuits 84, 86. The outputs of the multiplying circuits 88, 90 are fed to a summer 92, the output of which is used as one of the inputs to the controller 40.

The pilot can be used for obtaining channel estimates to allow good phase alignment and weighting of the originally raked signal components. The pilot can also be used to determine the relevant powers of the components of the output of the various Rake fingers in order to assign Rake fingers and searchers. The operation of the control unit as shown in FIG. 4 is exactly the same as that described with reference to FIG. 1.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. An apparatus for providing a digital radio link between at least one fixed unit and at least one mobile unit, the apparatus comprising:

a means for controlling operation of a plurality of Rake fingers so that at least one of the plurality of Rake fingers is arranged to search a delay spread at a point in time;

a means for examining associated with the plurality of Rake fingers for examining an energy of each of the plurality of Rake fingers and determining when one of the plurality of Rake fingers has an energy level lower than an energy level of a currently searching Rake finger; further comprising a shift register connected to the plurality of Rake fingers wherein each stage of the shift register is connected in parallel to each Rake finger; and a means for selecting which shift register stage is connected to a particular one of the plurality of Rake fingers.

2. The apparatus for providing a digital radio link of claim 1, wherein the means for selecting the shift register stage is a multipath switch.

3. The apparatus for providing a digital radio link of claim 1, wherein the means for selecting the shift register stage comprises a memory having a plurality of pointers.

4. The apparatus for providing a digital radio link of claim 1, wherein the means for selecting the shift register stage comprises a controller having a means for receiving outputs from each Rake finger and a means for selecting a smallest measured received signal having an output which controls a further switch for controlling an output from a selected Rake finger.

5. The apparatus for providing the digital radio link of claim 4, wherein the output from the means for selecting a smallest measured received signal is applied to an input of a corresponding ring counter, said ring counter being controlled by a conflict resolver to control the means for selecting the shift register stage.

6. The apparatus for providing a digital radio link of claim 1, wherein the apparatus is comprised of a differential phase shift keying receiver.

7. The apparatus for providing a digital radio link of claim 1, wherein the apparatus is comprised of a binary phase shift keying receiver having at least one pilot signal.

8. The apparatus for providing a digital radio link of claim 1, wherein at least two of the plurality of Rake fingers perform searching simultaneously.

* * * * *